(12) United States Patent
MacEnany

(10) Patent No.: US 6,466,021 B1
(45) Date of Patent: Oct. 15, 2002

(54) DEEP UNDERGROUND IMAGING UTILIZING RESISTIVITY REGULARIZATION FOR MAGNETOTELLURIC PROCESSING

(75) Inventor: David C. MacEnany, Laruel, MD (US)

(73) Assignee: Apti, Inc., Washington, DC (US)

( * ) Notice: Subject to any disclaimer, the term of this patent is extended or adjusted under 35 U.S.C. 154(b) by 0 days.

(21) Appl. No.: 09/594,582

(22) Filed: Jun. 8, 2000

Related U.S. Application Data

(63) Continuation-in-part of application No. 09/074,157, filed on May 7, 1998, now abandoned.

(51) Int. Cl.[7] .............................. G01V 3/00; G01V 3/08; G01V 3/38; G01V 3/12
(52) U.S. Cl. ..................... 324/350; 324/335; 324/345
(58) Field of Search ................... 324/335, 345, 324/348–350, 357, 359; 702/2, 5, 6

(56) References Cited

U.S. PATENT DOCUMENTS

| | | | |
|---|---|---|---|
| 4,792,761 A | * | 12/1988 | King et al. ................. 324/350 |
| 5,043,667 A | * | 8/1991 | Schofield ................... 324/350 |
| 5,878,372 A | * | 3/1999 | Tabarovsky et al. ........... 702/6 |

* cited by examiner

*Primary Examiner*—Gerard R. Strecker
(74) *Attorney, Agent, or Firm*—Rossi & Associates

(57) ABSTRACT

A method and apparatus for imaging deep underground objects utilizes the application of a spectral regularization routine that is applied to measured data prior to the application of an inversion routine to measured surface impedances to map subsurface conductivity. Specifically, measurement of magnetic and electric fields is conducted utilizing sensors at a measurement site, a processor is used to generate either resistivity or conductivity data based on the measurements of the sensors, the processor then performs the spectral regularization routine and an inversion routine to generate data that can be utilized to identify underground targets. The spectral regularization routine and inversion routine can either be processed separately (decoupled) or together. The measurements of the magnetic and electric fields are preferably made under the assumption of the presence of a plane wave at the measurement site.

2 Claims, 8 Drawing Sheets

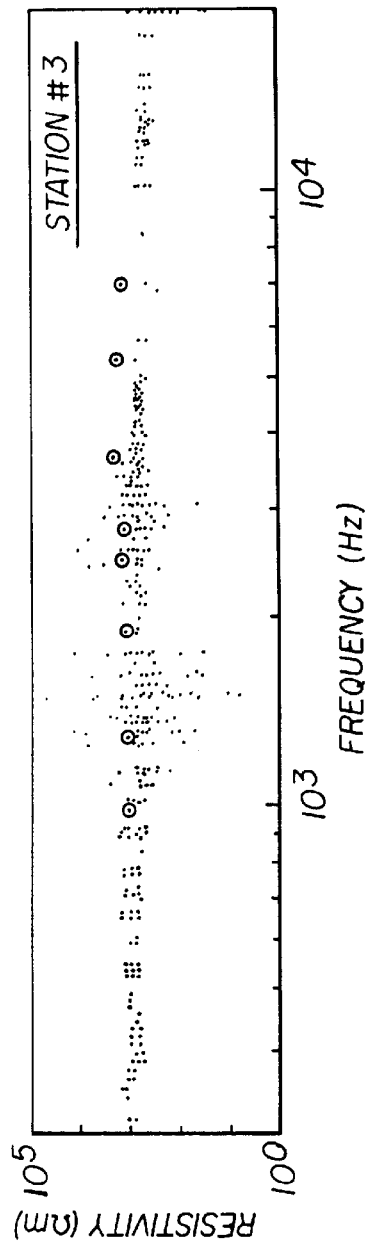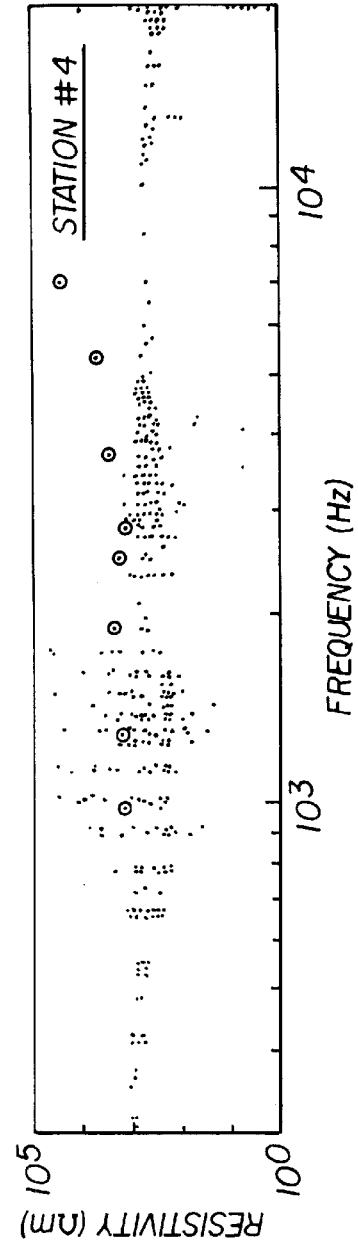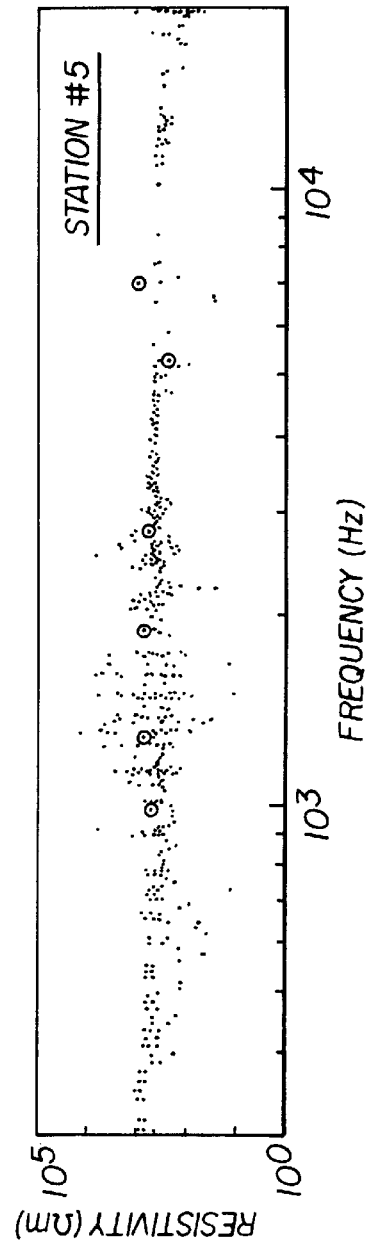

DEEP UNDERGROUND IMAGING UTILIZING RESISTIVITY REGULARIZATION FOR MAGNETOTELLURIC PROCESSING

CROSS-REFERENCE TO RELATED APPLICATIONS

The present application is a continuation-in-part application of, and claims priority from, U.S. patent application Ser. No. 09/074,157 filed on May 7, 1998, now abandoned, the contents of which are herein incorporated by reference.

FIELD OF THE INVENTION

The invention relates, in general, to the field of magnetotelluric (MT) inversion methods, a collection of electromagnetic geophysical prospecting techniques used to inverse image underground conductivity variations. More specifically, the invention provides an apparatus and method that works to minimize resolution loss due to the kind of output stabilization and smoothing commonly used in MT inversion methods. The technique is a particular type of inverse input conditioning that filters out noise effects but, in principle, involves no loss of resolution.

BACKGROUND

If one considers electromagnetic techniques for imaging underground conductivity variations that employ ideal steady-state, far-field plane wave excitations as input across a range of driving frequencies and restricts attention to inversion methods that are cast in the frequency domain, then—in the context of practical noise considerations—one must define all non-steady state and non-plane wave excitations as inadmissible input excitations to the inversion problem. For the purposes of this discussion, the MT inversion problem will be defined by these assumptions.

Every inversion problem involves a model describing all that is assumed about the forward problem of interest. A collection of model pieces in general, this model can be called the prior model because it is based exclusively on what is taken as fact, and to what degree, before any data is observed. No inversion problem is solved or can be solved without a prior model specification, although it is not always set out in an obvious manner. Every inversion problem also involves observed data that may be defined at the output of a forward system, i.e., the input to the inversion process. The prior model includes the specification of such observers. In what follows, an attempt will be made to make the prior specification of the MT problem apparent so as to render clear the contribution of the present invention.

In the ideal noise-free case, the MT forward problem is governed by the steady-state Maxwell's equations involving plane wave excitation of ground media for a collection of frequencies. The conductivity properties of common ground media require the use of low frequency plane waves to obtain significant depth of penetration. In such media, the required frequencies are typically low enough that, to a good approximation, Maxwell's equations reduce to diffusion equations and not to wave equations as is more common. This may be emphasized as the reason why MT methods do not enjoy the kind of resolution that is comparable, for example, to radar techniques. Nevertheless, there are existence and uniqueness theorems, e.g., for the one-dimensional inversion problem, that guarantee exact and unique inversion, in principle, for suitably well-behaved conductivity profiles.

It is in the context of this dichotomy—exact, unique inversion is possible in principle, while practical algorithms typically deliver poor resolution—that the concept of "ill-posedness" usually arises. Well-posed problems, in particular inversion problems, may be defined as having three properties:

1) A solution exists;
2) The solution is unique; and,
3) The solution depends (Lipschitz) continuously on the data (with a Lipschitz constant that is not too big), i.e., small changes in the input data (small with respect to some input reference) result only in small changes in the solution (small with respect to some output reference).

In the conductivity inversion problem, it is the third condition that presents real difficulty with respect to well-posedness. Indeed, inversion algorithms that do not properly address this third condition often exhibit wild variation in their solution output.

Handling ill-posed problems often involves the use of so-called regularization techniques that essentially "re-pose" the problem so that all three conditions are satisfied. It is interesting to note that the initial development of regularization theory was motivated by the MT problem itself. Unfortunately, the use of regularization usually costs resolution since dealing with highly variable solutions, i.e., avoiding solutions characterized by high-pass spatial variation, or noise, equivalently amounts to some kind of spatial low-pass filtering. As a result, properly addressing an ill-posed problem, in particular one requiring significant attention to resolution, means that whatever technique is used to render the problem well-posed, it should employ minimum low-pass filtering. Proper address therefore demands a clear definition of an objective component to minimize that can deliver such minimal filtration. In physical problems, such objective functions are ideal when they can be cast directly in terms of the physics of the problem. They are otherwise uncomfortably referred to as ad hoc, though often still necessary for stabilization purposes.

As defined above, the MT inversion problem assumes steady-state plane waves as input. Practically speaking, however, measured electromagnetic fields always have a portion involving time-varying and/or non-planar wave effects. As a result, a central problem is estimating the usable part of the total electromagnetic field on-site, namely, that due to steady-state plane wave excitation and response. Indeed, only this part of the total measured field constitutes physically justifiable input to an MT inversion algorithm proper; the remainder is noise or interference.

Dealing with the steady-state plane wave input requirement involves two basic approaches, one emphasizing source power and the other signal processing. The first concerns the ability of a given source to deliver to the measurement site plane waves of sufficient power, across a broad and dense spectral band, such that any on-site interference is relatively weak in comparison. The second approach emphasizes signal processing methods to derive from the measured signals the maximum content due exclusively to steady-state plane wave input.

Consider the first approach. However powerful the source, wave planarity still depends on justifiable far-field assumptions which in turn depend on the type of source, the source-to-site proximity, and, in the purely spectral approach taken here, the driving frequencies involved. Source types can be divided into natural sources and artificial/man-made sources; the latter can be further broken down according to controlled or uncontrolled sources. Plane waves due to natural sources can be used for MT imaging, but their random nature emphasizes proper signal processing. Some uncontrolled artificial sources offer significant steady-state plane wave power but have a frequency spacing too sparse be used alone. Ground-based controlled sources typically have the problem that either they cannot guarantee the delivery of sufficient power at a measurement site, or, that such a guarantee leads to source-to-site proximities so small as to violate the far-field, plane wave assumption. These difficulties have led to the investigation of controlled source techniques that attempt to include the more complicated near-field model. These methods are therefore not MT techniques and will not be discussed further. More recently, the controlled source problem has been addressed using ionospheric sources that can—by design—reliably deliver steady-state plane waves over global scales. Such sources once again place the emphasis on signal processing techniques to deal with non-plane wave and time-varying noise interference.

Signal processing to address the MT problem relies on the prior model restriction that valid input excitations consist of steady-state plane waves. This means that signal interference for the MT problem as defined consists of:

1) Non-steady state excitations; and,
2) Non-plane wave excitations.

In general, processing field data to filter out steady-state, non-plane wave interference requires the use of both on-site and remote reference sensor measurements at locations far from the primary site. The approach relies on the prior knowledge that such interference cannot be simultaneously far field to well separated locations while steady-state plane waves, by definition, are everywhere far-field. It works as a spatial filter, based on field cross-spectral estimates obtained using measurements at both sites, to deliver impedance ratios that phase compensate for stationary, near-field effects. It should be clear that the strict approach has decreasing performance as the local/remote separation distance gets smaller. The availability of one or more remote references offers improved estimates in the case of natural background noise but, in general, the exploitation of natural plane waves often requires more observation time. It is important to stress that natural background and controlled plane wave sources differ because the latter offer access to excitation priors such as oscillation schedules and direction of arrival information.

At this point it should be stressed that the term "far field" is used in two contexts in MT imaging to refer to distances that essentially depend on:

1) Frequency in terms of wavelengths, above ground; and,
2) Both frequency and conductivity in terms of skin depth, below ground.

Above the ground, remote reference distances are assessed in terms of atmospheric wavelengths that depend on the driving frequencies used; the driving frequencies used depend on the both the depth of interest and below the ground conductivity. This chain of dependencies, and the fact that both the depth of interest and the conductivity are usually unknown, makes clear the reason why MT problems in general involve excitation frequencies over very wide bandwidths. As an aside, it can be mentioned that common ground conductivities and depths of interest are the reason why the spectral bands that are used often include low audio frequencies.

A lack of remote reference data requires model priors restricted to time and/or frequency domain characteristics. As an example, consider interference due to large, nearby machinery that cannot be moved. If it is known that the machinery has a regular downtime, then one is clearly motivated to perform measurements during these periods. More sophisticated time domain techniques are of course possible but not discussed here. A common frequency domain technique is based on using coherence statistics, defined in terms of the measured field components point-wise in frequency, to weight, or exclude from further processing, measurements that do not exhibit sufficiently high correlation. This exploits the prior that ideal plane waves have field components that are predictably correlated. For example, the electric and magnetic field components of a plane wave at a given point in free space are precisely 90° out-of-phase, in the ideal, and therefore deliver a coherence of unity. It should be obvious that the larger separation scale, the more reliable coherence estimates can be for non-plane wave rejection. On the other hand, electromagnetic fields that do not obey a plane wave relation but which still deliver relatively high coherence, even over significantly long baselines, are clearly possible. Hence, care must be taken since the logic of signal rejection using coherence is not contrapositive: Low coherence certainly implies "non-plane wave," but high coherence does not certainly imply "plane wave." The use of coherence statistics and remote reference techniques together is clearly motivated.

The prior assumption was that the measured signals are steady state, or, in terms of a statistical model, stationary. Indeed, the discussion above dwelled on statistics defined in the frequency domain, where unless this condition is sufficiently satisfied, the long term averaging that is necessary to obtain impedance estimates, coherence statistics, etc., is not well defined. Regarding such temporal aspects, recall that a steady-state plane wave is a conceptual ideal describing not only a source located "far away," but also one that was started "long ago." The condition of "far away" enters so that the arriving waves may be modeled as enjoying the property of spatial planarity, and all the simplifications that follow. The condition of "long ago" enters, as usual, so that one may consider arbitrary initial conditions as being so small that they can be ignored. But non-steady state and non-plane wave interference, by definition not "far away" enough, is also a source of noisy signals that are therefore not "long ago" enough with respect to computing reliable frequency domain statistics. In particular, if the nature of the disturbances is such that the total signal is not well modeled as a stationary, ergodic process, "for significant periods of time," then spectral estimates derived over these periods are not well defined. Practically speaking, estimates based on such non-stationary, non-ergodic processes do not "settle" to a mean value in the limit of long term averaging.

Such "time-varying" interference can be addressed using another physical prior, namely, the fact that the underground conductivity is itself time constant. This time-invariance property of the ground suggests a model for the observed resistivity due to steady-state plane wave excitation as a stationary random process. For example, many kinds of non-far field interference are relatively short-lived in time duration, e.g., that due to relatively nearby lightning strokes. Such non-stationary interferers lead to wide-band changes in resistivity estimates based on short-time spectra. This renders it fairly straightforward to reliably detect such spectra and exclude them from input into final resistivity estimation using a number of signal processing techniques. The successful removal of such outliers yields a signal environment more comfortably modeled as stationary and steady-state.

In the following preferred embodiment section of this application, an additional prior is presented that delivers a new, follow-on approach to preparing the impedance estimates for input into MT inversion. This approach is based on finding an optimal fit, as a function of frequency, through a collection of impedance estimates at each analysis frequency. The objective function defining optimality is derived using physical dispersion priors that are known to hold true in the ideal.

SUMMARY OF THE INVENTION

The invention works to ensure that resistivities subject to inversion, namely those derived from electromagnetic measurements taken under steady-state plane wave excitation, satisfy the minimum phase and minimum group phase properties required by the physics of the canonic MT problem. Resistivities without these properties are not valid for MT inversion and will lead to reconstruction artifacts and inversion output instabilities. Such artifacts and instabilities may be handled using regularization in the output domain, but their address in this domain usually leads to a direct loss of resolution. On the other hand, these phase minima requirements lead to no loss of resolution in principle, even though they work to maintain a smooth, stable solution if noise is present. Simply stated, the invention is an efficient technique that helps maximize inversion output resolution that might be otherwise squandered for the sake of stabilizing the final solution. It works by minimizing inversion input phase constraints that are known to be satisfied in the ideal, a priori, for resistivities due to plane wave excitations.

BRIEF DESCRIPTION OF THE DRAWINGS

The invention will be described with reference to the accompanying drawings:

FIGS. 9(a)–(c) are plots of post-thresholded resistivity data obtained from stations three, four and five.

DETAILED DESCRIPTION OF THE PREFERRED EMBODIMENTS

Figure 1:
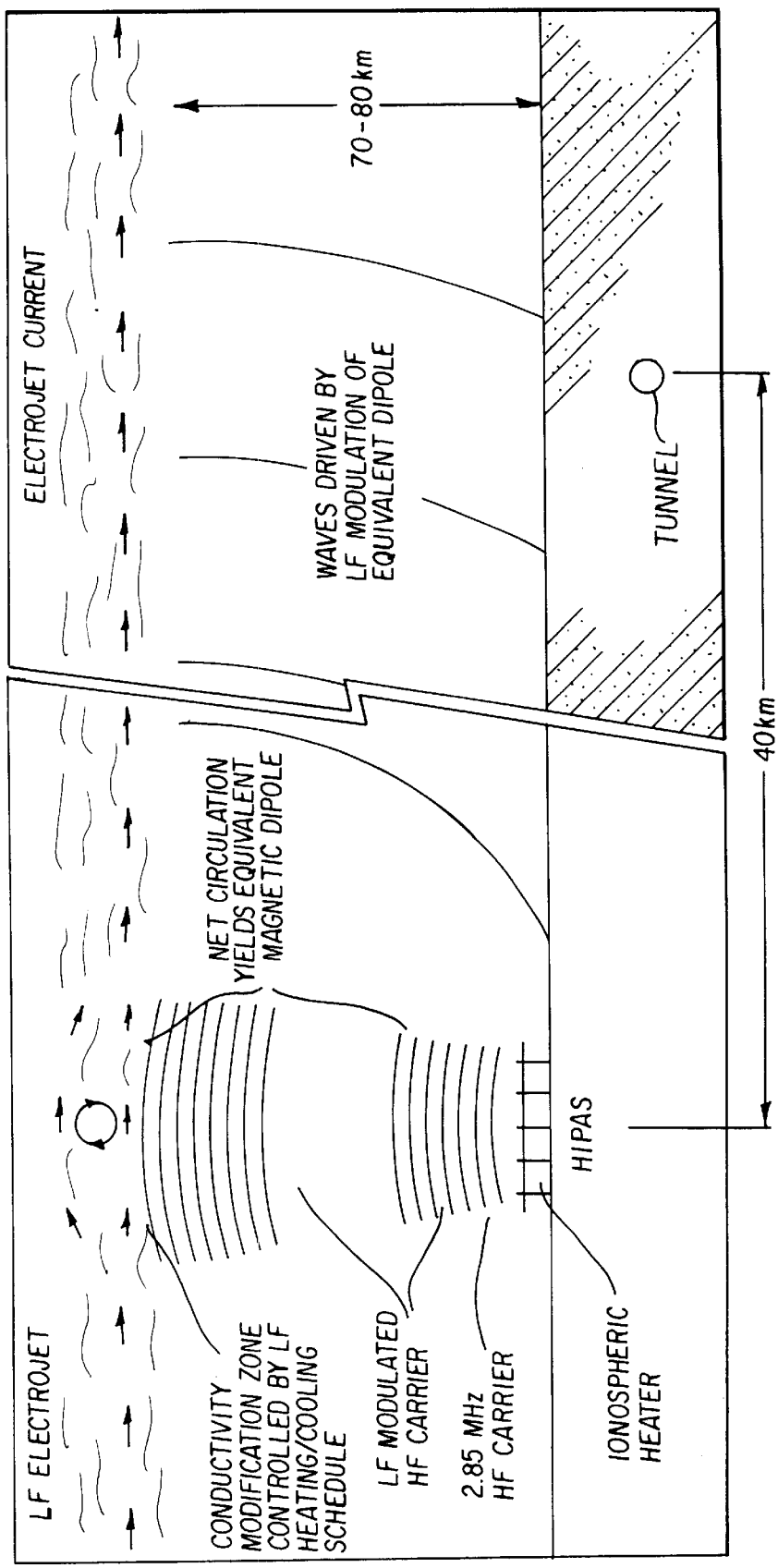
FIG. 1 is a diagram illustrating the ionospheric generation of low frequency waves.

For an ideal ground conductivity model, steady-state plane wave excitations will deliver predictable surface impedance quantities according to Maxwell's equations. Using actual field measurements, surface impedance measurements resulting from the signal processing discussed above will better satisfy the steady-state plane wave signal hypothesis. However, such estimates will still be far from noise-free in the practical MT problem and the presence of noise will destabilize the inversion process. To handle this problem, we are fortunate to have additional priors that rest on highly justifiable physical assumptions. Consider first the bandwidth and resolution of the plane wave driving frequencies.

Regarding bandwidth, the lowest and highest plane wave driving frequencies should correspond to skin depths that bracket the typically unknown depth of interest. Practically speaking, the deeper bracket depth should exceed the depth of interest by at least a factor of two. The more shallow bracket depth should be close to the ground surface in order to ensure that minimal estimation error is available to accumulate to deeper depths.

The frequency spacing of the plane wave driving excitations should be rather dense. This is because depth resolution directly depends on frequency resolution. Moreover, the dispersion priors discussed next deliver "high pass" constraints, as do most noise reduction techniques dealing with ill-posedness; such constraints yield better results when given input with denser frequency samplings. It can be shown that, in principle, imposing these dispersion priors does not affect spatial resolution despite the fact that they directly address the ill-posedness discussed earlier.

If one defines Z=Z(f) as the driving point impedance that relates the electric and magnetic fields, E and H, defined at the ground surface for each frequency f, then in the ideal, steady-state noise-free case:

1) The fields are linearly related with system description: E=ZH;
2) The ground is time invariant;
3) The ground is a causal system;
4) The ground is a stable system; and,
5) The time-domain impulse response of the ground is real-valued.

Justifying that the above physical prior conditions hold is close to trivial for the problem at hand. That E and H are linearly related is essentially the plane wave prior. Although the ground changes on tectonic time scales, it is reliably constant, excepting earthquakes, during the measurement times considered here. The ground is a causal system: In the gedanken case of no background noise, there is no field response before a field is applied. It follows that the ground is an electromagnetically stable; indeed it is a passive system due to ohmic losses. Finally, the time-domain response of the ground to a real-valued signal is similarly real-valued.

In the noise-free case these conditions imply, a fortiori, that the ground impedance, Z, enjoys three special properties:

1) It satisfies the Kramers-Krönig dispersion relations;
2) It has (positive) minimum phase lag; and,
3) It has minimum group phase lag.

These well-known relations amount to prior conditions satisfied by physically passive grounds and are widely mentioned in the geology literature. The dispersion relations are variously described in different forms as the Kramers-Krönig relations, Bode formulas, Cauchy identities, etc. These prior conditions come in pairs defined by the log-magnitude and phase (or real and imaginary parts) of the ground resistivity (or impedance), each component expressed in terms of some integral of the other. One integral gives the phase of the resistivity in terms of an integral of its log-magnitude. It can be expressed a number of ways yielding good, numerically stable approximations and this suggests its direct use as a phase dispersion prior. This integral is discussed in the literature as a way to construct phase estimates from resistivity magnitude estimates. These dispersion properties are also discussed as a basis to derive consistency tests that measured impedance data must pass before follow-on processing. See, for example, Yee, E., Paulson, K. V., 1988, "Concerning Dispersion Relations For the Magnetotelluric Impedance Tensor", Geophysical Journal, 95, 549–559. However, nowhere has it been seen discussed for its use as a strict estimation prior for proper physical conditioning of the input to the inversion problem.

The five conditions above also imply that a physically consistent ground impedance is minimum phase. The fact that the ground is minimum phase is mentioned in the geology literature. See, for example, Vozoff, K. 1972, "The Magnetotelluric Method, in Investigations in Geophysics", Vol. 2, Part A, 641–711. However, its use as a prior constraint in addressing the inversion problem is not discussed. The conditions also imply that the ground impedance is minimum group phase. This fact was not found mentioned in the geology literature at all. Taken together, reference will be made to these phase minimality conditions as the phase lag priors. These phase lag priors can be used directly to define a number of objectives to be minimized, subject to a condition on the fit of the measured data as usual.

Not surprisingly, the phase lag priors are closely related to the phase dispersion prior as described by the Kramers-Krönig relations. As a result, direct employment of both might be considered redundant. However, one variant exploits both in the following approximate manner. We begin by defining the complex resistivity, $\rho_c$, as $$\rho_c(f) = \frac{Z^2(f)}{j2\pi f \mu} \quad 0 \le f$$

where $\mu$ represents magnetic permeability. The phase dispersion integral enjoys an approximation for the resistivity phase in terms of its log-magnitude as, $$\angle \rho_c(f) \approx \frac{\pi}{2} \frac{d \log|\rho_c(f)|}{d \log f}.$$

This approximation is quite good and enjoys some important properties. See, for example, Weidelt, P., 1972, "The Inverse Problem of Geomagnetic Induction", Z. Geophys., 38, 257–289. One is that an optimization that exploits the left-hand side is now about equivalent to one in which $\angle \rho_c$ is replaced by the right-hand side. Inspection of the right-hand side makes clear that a minimum phase lag constraint delivers a point-wise regularization constraint on the log-magnitude of the complex resistivity over a logarithmic frequency scale. Thus, the Kramers-Krönig phase dispersion integral together with the minimum phase lag prior deliver a smoothness condition demanded by the basic physics. Technically speaking, the two conditions amount to an idempotent constraint: In the case of no noise, a complex resistivity will pass untouched; in the case of noise, it will be smoothed.

We can go further. If we next explicitly express dealing with the phase lag priors as that of simultaneously minimizing both the phase lag and the group phase lag, given as, $$-\frac{2}{\pi} \angle \rho_c > 0 \text{ and } -\frac{d \angle \rho_c}{d \log f},$$

then we can approximate this problem as that of keeping both $$-\frac{d \log|\rho_c|}{d \log f} \text{ and } -\frac{d \angle \rho_c}{d \log f},$$

as small as possible while $\rho_c$ still respects the measured data. We note that minimizing the phase lag, defined as $-\angle\rho_c$, is the same as minimizing, $-2/\pi \angle \rho_c$. Forming the complex combination of the two, $$-\frac{d \log|\rho_c|}{d \log f} - j\frac{d \angle \rho_c}{d \log f} = -\frac{d}{d \log f}[\log|\rho_c| - j\angle\rho_c],$$

we see that the same optimization can be expressed in terms of the real and imaginary components of, $$-\frac{d \log \rho_c}{d \log f} = -\frac{d}{d \log f}[\log|\rho_c| + j\angle\rho_c].$$

If an $L^2$ magnitude formulation is used, then keeping $$\left|\frac{d \log \rho_c}{d \log f}\right|^2$$

small amounts to requiring the $\rho_c$ solution as having phase and group phase that are restricted to lie on discs of minimum radii in the complex plane as a function of frequency. This lends an approximate geometric interpretation to these two physical requirements that must be satisfied by any sought after resistivity. Employing this $L^2$ constraint, a phase dispersion prior objective can be written as, $$\int |r'|^2 df,$$

where we have defined, $r = \log \rho_c$. Minimizing this prior objective subject to some maximum observer error defined in terms of, $$\int G_i |r - \tilde{r}|^2 df,$$

gives us the sought after solution; included here is $\tilde{r}$, the "observed" input data, and G, a weighting/whitening function derived from the noise pre-processing discussed above. In the simplest case, $\tilde{r}$ is an average of a number of measurements taken at each frequency, commonly subject to outlier rejection. For simplicity, one can define an overall objective in familiar Lagrangian form as, $$J[r|\tilde{r}] := \int G_i |r - \tilde{r}|^2 df + \lambda \int |r'|^2 df$$

and cast the problem as minimizing $J[r|\tilde{r}]$ with respect to r for $\tilde{r}$ given, i.e., $$r^* \equiv \arg \min_r J[r|\tilde{r}].$$

We see that this optimization objective makes a clear distinction between the observer involved in the first integral and the prior involved in the second integral.

To summarize, a decoupled argument has been used to indicate how data might be processed in preparation for an MT inversion algorithm, in particular, an algorithm that expects field measurements taken under the assumption of steady state plane wave excitation of a passive medium. Such a medium delivers an impulse response having a transfer function whose magnitude and phase satisfy the Kramers-Krönig dispersion relations. These relations, together with the minimal phase priors, yield a physically justifiable prior model that allow one to define a constraint that must be satisfied by the resistivity input to a numerical MT inversion process. Since this constraint involves a derivative in the second integral, it is a local constraint, and so complements the pointwise in frequency coherence processing and nonstationarity detection that is used to filter out measurements due to non-plane wave excitations. Because the dispersion relations involve conditionals that do not involve spatial dimensionality, the employment of the technique is one-dimensional in frequency, and therefore fast, irrespective of the prior model for the dimensionality of the underground conductivity distribution.

The process has been described in a decoupled manner, namely, to argue that measured data should be "filtered" to appear as if the output of a well-designed, physically well-modeled forward code. The filtering so described is not known to be currently used in the geosciences. One can expect better results if the overall processing is executed in a non-decoupled manner, although this description is more difficult.

A system for utilizing the inventive process to identify underground objects will now be described. FIG. 1 illustrates the ionospheric generation of low frequency waves by amplitude modulation of a ground based HF transmitter (for example the High Power Auroral Stimulation (HIPAS) facility in Alaska). The "dynamo" like interaction of the solar wind flowing past the geomagentic field generates currents flowing along the magnetic field (Birkeland currents) connecting the collisionless magnetosphere to the ionosphere. The field aligned currents close in the collision dominated auroral ionospheric plasma, between 70–100 km, via a horizontal current known as the auroral electrojet. The local current density of the electrojet is proportional to the plasma conductivity which in turn depends on the ambient electron temperature. The electron temperature can be controlled over a limited volume through the use of an ionospheric heater. Since the heating and cooling times of the electrons by the HF waves are very fast (10–100 microseconds), amplitude modulation of the HF modulates the local conductivity. Due to the decrease in the conductivity in the heated volume, the modulation frequency is generated. The direction of the magnetic moment M, which controls the polarization of the radiation, depends on the energy deposition altitude which in turn depends on the combination of HF frequency and power. At altitudes above 80 km, the electrojet current is a Hall current and flows perpendicularly to the direction of the ionospheric electric and magnetic fields. The modified current is in the direction of the electric field and the magnetic moment is in the direction of the Hall current. At lower altitudes, the Pedersen current dominates and the magnetic moment turns towards the direction of the electric field. The signals couple to the EIW and propagate in the TEM mode.

Figure 2:
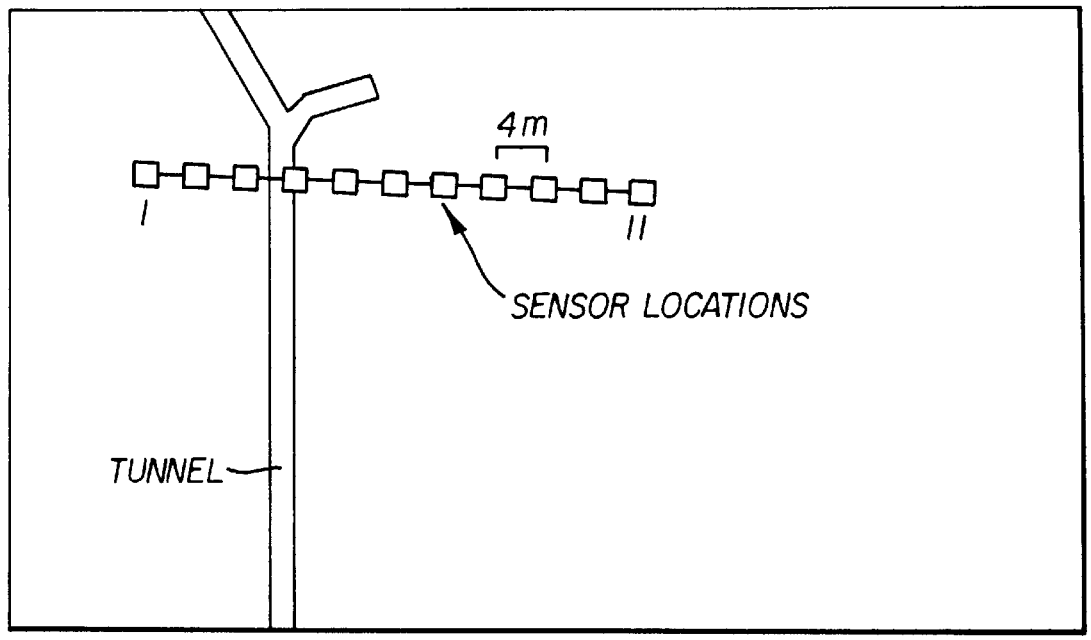
FIG. 2 is a top view of a array of sensor stations for gathering data.
Figure 3:
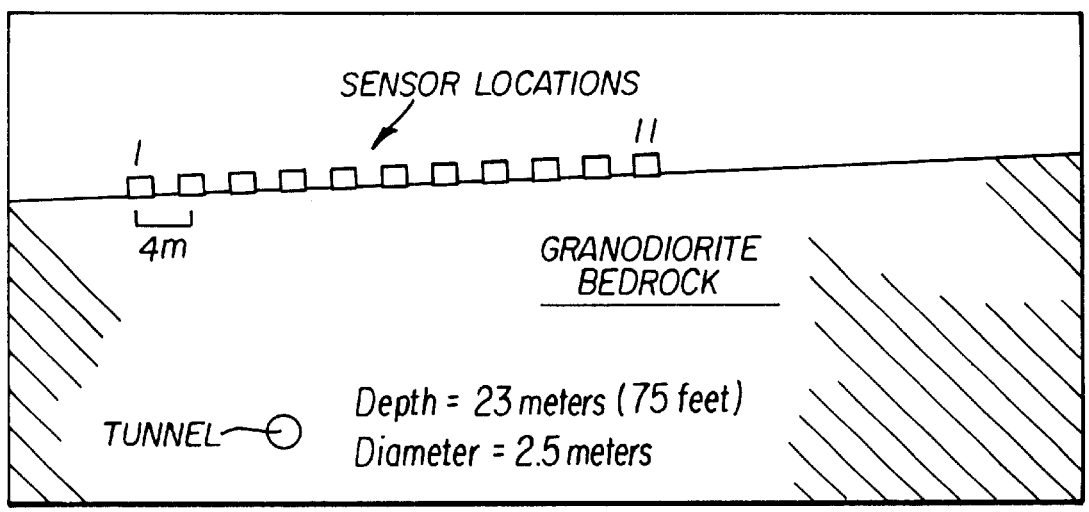
FIG. 3 is a side view of the array illustrated in FIG. 2.

Turning now to FIGS. 2 and 3, top and side views of a sensor layout used in testing the invention by detection of the Silver-Fox mine are illustrated. The mine was an unlined tunnel into granodiorite bedrock, consisting of a single shaft of diameter 2.5–3 meters. Experiments were conducted a night between 8 PM and 2 AM local time, which was known to provide the strongest electrojet current. Measurements were taken along a line of approximately 92 meters with sensor stations placed at four meter intervals. For purposes of simplification, only eleven sensor stations are illustrated in the drawings. The line was almost perpendicular—off by two degrees—to the tunnel centerline and crossed the mine between the third and fourth sensor stations; at this point the mine floor was at a depth of 22.7 meters beneath the surface. Magnetic fields were measured with ferrite-loaded coils and electric fields were measured using stainless steel stakes with shielded leads and an isolated differential amplifier. The fields were measured in orthogonal directions along the survey line: in line and at right angles. Another pair of magnetic field sensors located approximately 200 meters from the target tunnel were used to measure remote reference signals. Measurements of the field components were made sequentially by repositioning the sensors at each station location. The HIPAS heater transmitted an X-mode carrier amplitude at a frequency of 2.85 MHz modulated between 0.5 and 12 KHz. Square modulation with 100% modulation depth was used.

Figure 4:
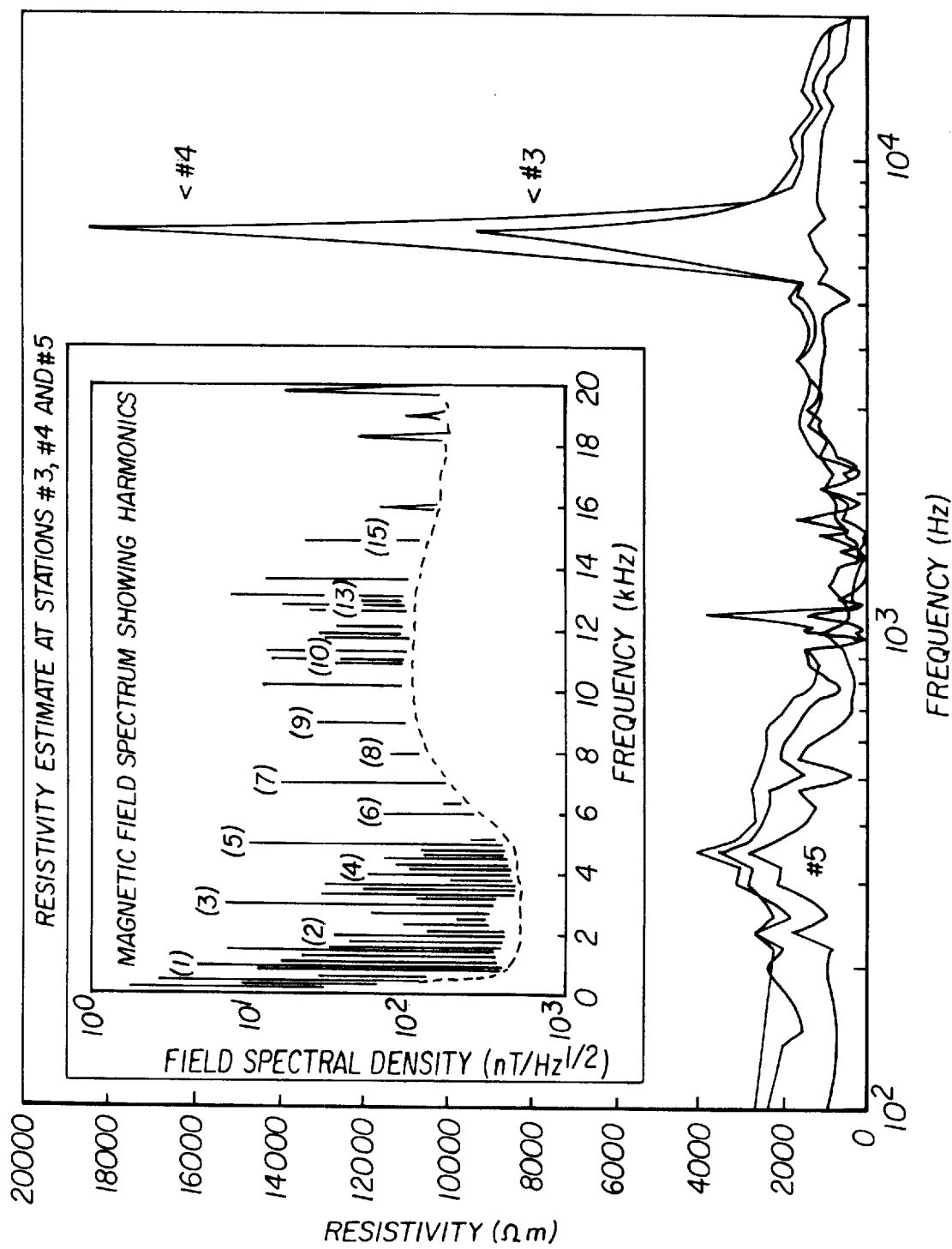
FIG. 4 is a diagram illustrating resistivity estimates at various sensor stations.

FIG. 4 illustrates apparent resistivity as a function of frequency for the TM mode for stations 3, 4 and 5 and frequency spectrum received at station 3 when the heater was modulated at 995 HZ (insert) computed from a one minute record. In addition to the fundamental which has an RMS amplitude of 5 pT large amplitude signals are generated at its harmonics up to the $15^{th}$. The signals generated are tens of db above noise. For data collection, the sensor stations were connected to a digital recorder and recorded at a sampling rate of 48 KHz. Autopower and cross power densities were computed. Typically 4096 points were used in the Fourier transform for the recorded data. The final data set consisted of a set of 2048 frequency dependent complex impedance for each TE and TM polarization per station and their associated coherence. Note the high resistivity perturbation due to the presence of the tunnel at frequencies near 7 kHz over the fourth station.

Figure 5:
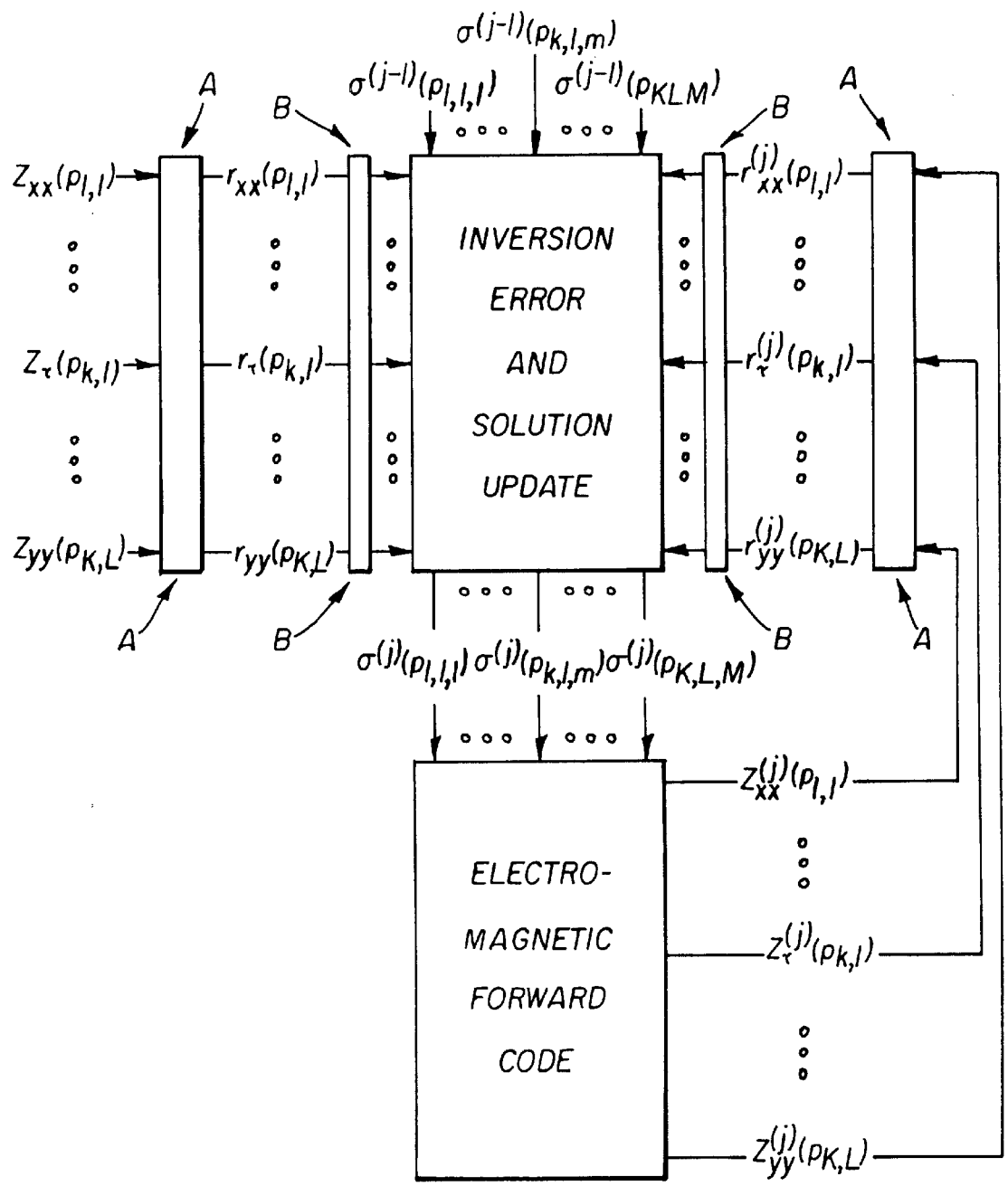
FIG. 5 is a block diagram of a processing unit in accordance with the invention.
Figure 6:
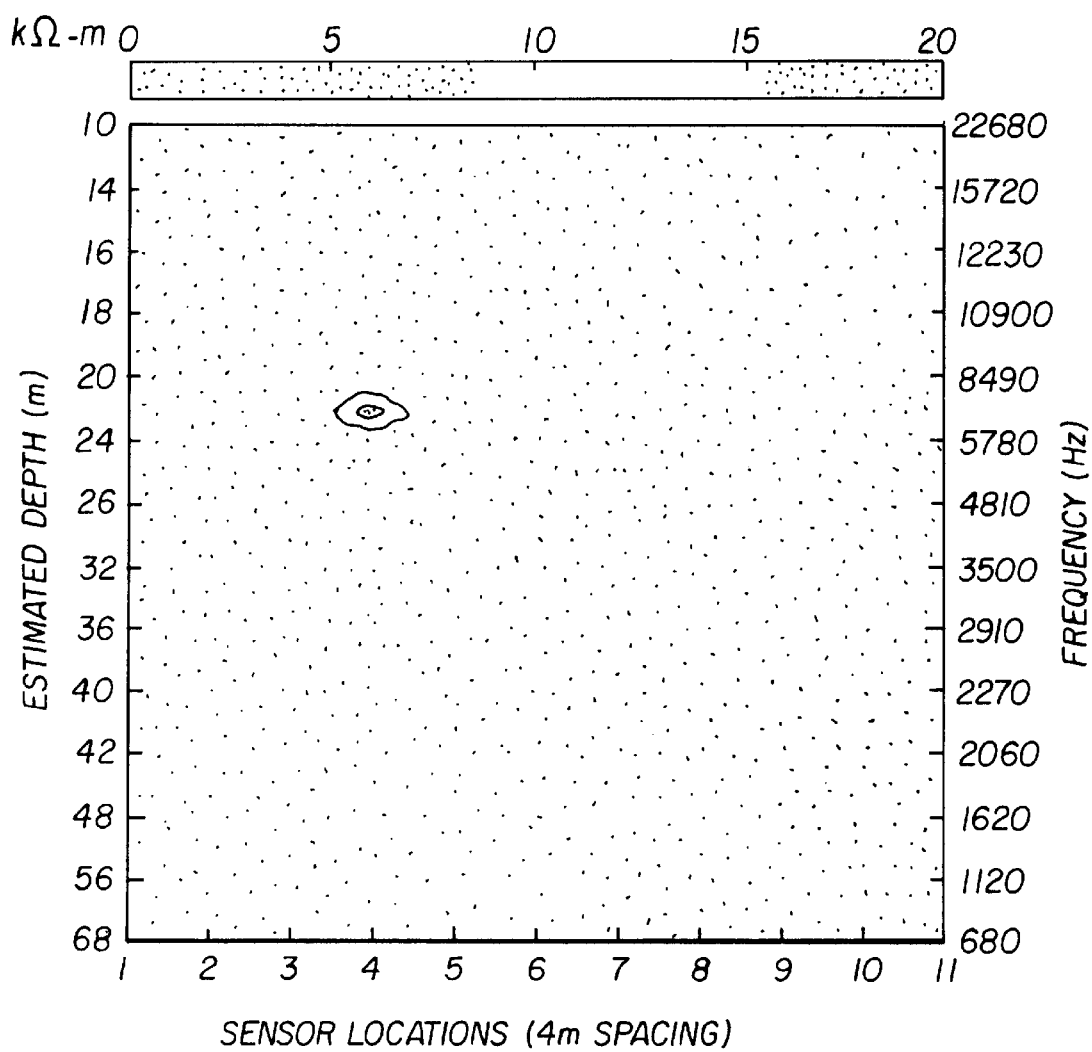
FIG. 6 illustrates an image of the tunnel generated by the present invention including the use of remote reference processing.

As illustrated in FIG. 5, the data from the sensor stations were applied to a processing unit that performs the processing routine described above. The tunnel image resulting from inverting the apparent resistivity data with remote reference processing is illustrated in FIG. 6. The depth chart was derived from the frequency image using a standard Bostick analysis for a two layer medium with the upper layer having resistivity of 16 ohms-m and a depth of 2 m and the lower layer resistivity of 1000 ohms-m. The tunnel is clearly indicated at the third and fourth sensor stations.

Figure 7:
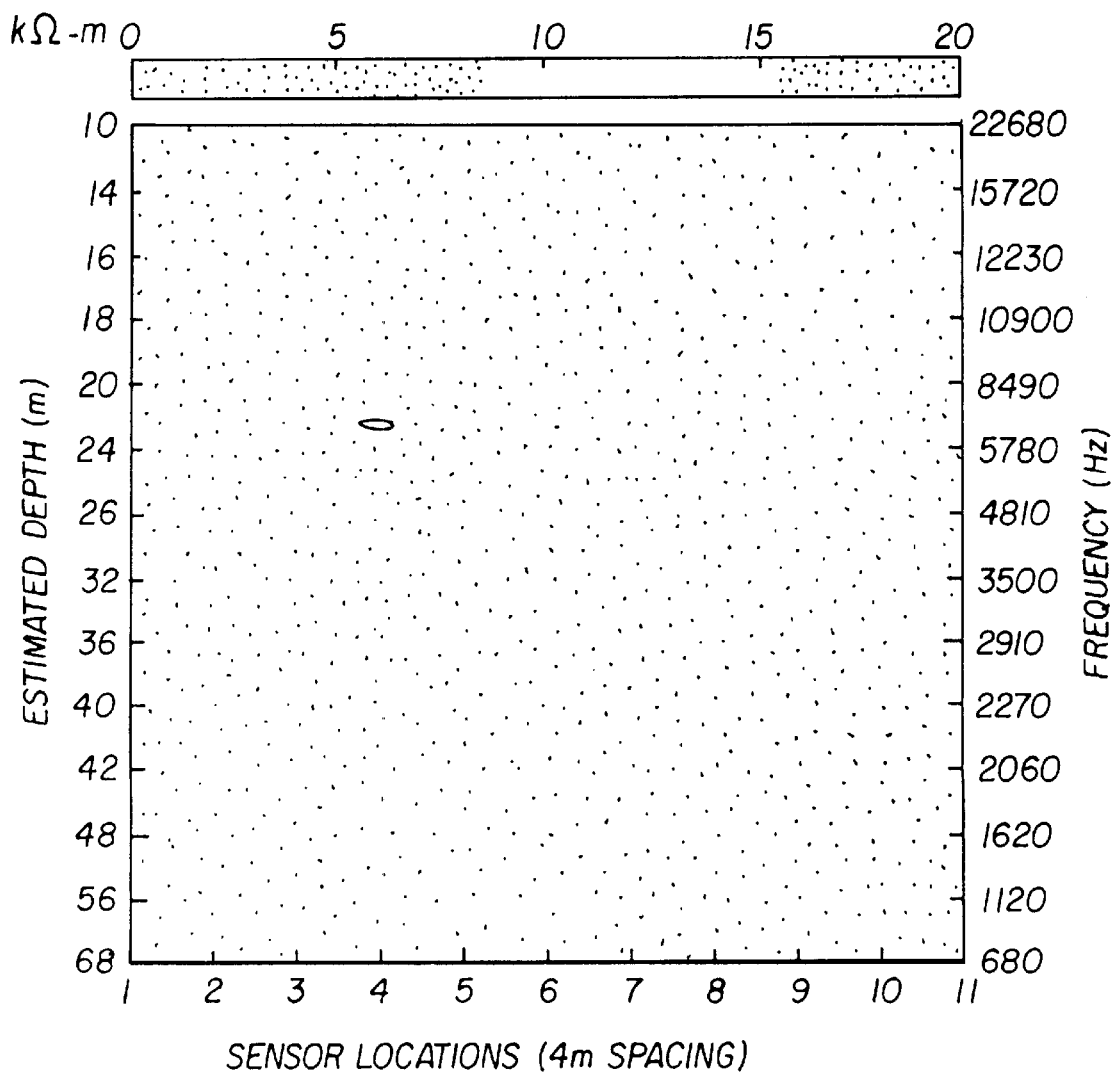
FIG. 7 illustrates an image of the tunnel generated by the present invention without the use of remote reference processing.

Although it is preferable to utilize remote reference data, it is possible to utilize the data set without the remote reference. FIG. 7 illustrates a version of an image obtained without the remote reference. The presence of the tunnel is still apparent, but at a much lower contrast.

Figure 8:
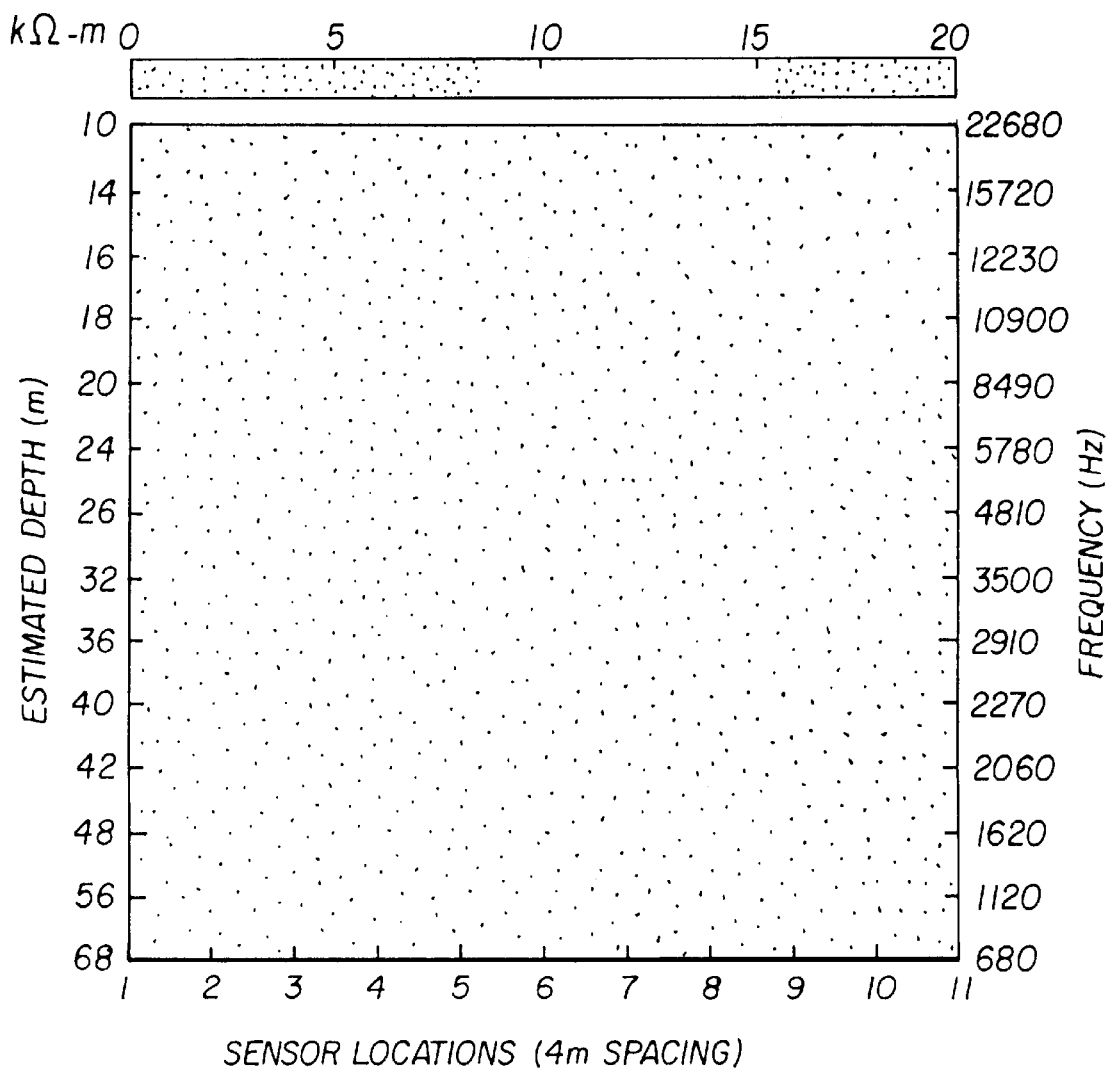
FIG. 8 illustrates the inability to image the tunnel with noise measurement only.

In contrast, FIG. 8 illustrates an image obtained using remote reference processing but with noise data only. The HIPAS frequencies and then first five harmonics were exercised from these data. For the integration times used here the presence of the tunnel cannot be detected by noise measurements only.

Plots of the post-thresholded resistivity data obtained from stations 3–5 are illustrated in FIGS. 9(a)–9(c). In each of the plots, the black points represent the TM resistivities obtained using the remote reference technique that have also exceeded a coherence threshold of 0.85. The circled points indicated the resistivities obtained at the primary frequencies of the HIPAS source excitations using only in-mode remote reference, i.e., TE channel data were not employed. Gaps in the data indicate frequency intervals in which no electromagnetic field data having sufficient coherence, using background signals or the HIPAS drive fields, where available.

The experiment described above demonstrated for the first time the use of a controlled ionospheric source for remote, high resolution, subsurface conductivity imaging. Although the experiment utilized relatively small magnetic dipole moments, the HAARP (High Frequency Active Auroral Research Program) heater in Alaska will be capable of producing horizontal moments in the range of $10^{10}$–$10^{12}$ A-m$^2$. For comparison, the Wisconsin Navy ELF facility which provides submarine communications coverage to US Navy vessels at 78 Hz has M=3×10$^{10}$ A-m$^2$. The HAARP heater will provide coherent ELF fields significantly above noise at distances of several thousands of kilometers from Alaska. Furthermore, similar heaters can be constructed at equatorial latitudes where they will modify the equatorial electrojet. Thus, one can envision that a network of 4 to 5 such heaters located at auroral and equatorial latitudes will provide tunable, plane wave sources with worldwide coverage for MT imaging.

As described above, the invention provides a method and apparatus for imaging deep underground objects utilizing the application of a spectral regularization routine that is applied to measured data prior to the application of an inversion routine to measured surface impedances to map subsurface conductivity. Specifically, measurement of magnetic and electric fields is conducted utilizing sensors at a measurement site, a processor is used to generate either resistivity or conductivity data based on the measurements of the sensors, the processor then performs the spectral regularization routine and an inversion routine to generate data that can be utilized to identify underground targets. The spectral regularization routine and inversion routine can either be processed separately (decoupled) or together. The measurements of the magnetic and electric fields are preferably made under the assumption of the presence of a plane wave at the measurement site.

Those skilled in the art will readily devise other embodiments of the invention that do not depart from the spirit of the invention as described herein. Accordingly, the invention should be limited in scope only by the attached claims.

What is claimed is:

1. A method of imaging underground objects comprising:

measuring magnetic and electric fields utilizing sensors located at a measurement site;

generating at least one of ground resistivity and ground conductivity data based on the measurements taken by the sensors utilizing a processor;

performing a spectral regularization routine on the generated data with the processor to generate regularized data, wherein the regularization routine includes a weighting factor that is dependent on the coherence of the measured signals at a given frequency; and performing an inversion routine to the regularized data with the processor to generate data indicative of an underground object.

2. An apparatus for imaging underground objects comprising:

means for measuring magnetic and electric fields located at a measurement site;

means for generating at least one of ground resistivity and ground conductivity data based on the measurements taken by the sensors utilizing a processor;

means for performing a spectral regularization routine on the generated data to generate regularized data, wherein the regularization data includes a weighting factor that is dependent on the coherence of the measured signals at a given frequency; and means for performing an inversion routine to the regularized data that generates data indicative of an underground object.

* * * * *